United States Patent Office 3,244,570
Patented Apr. 5, 1966

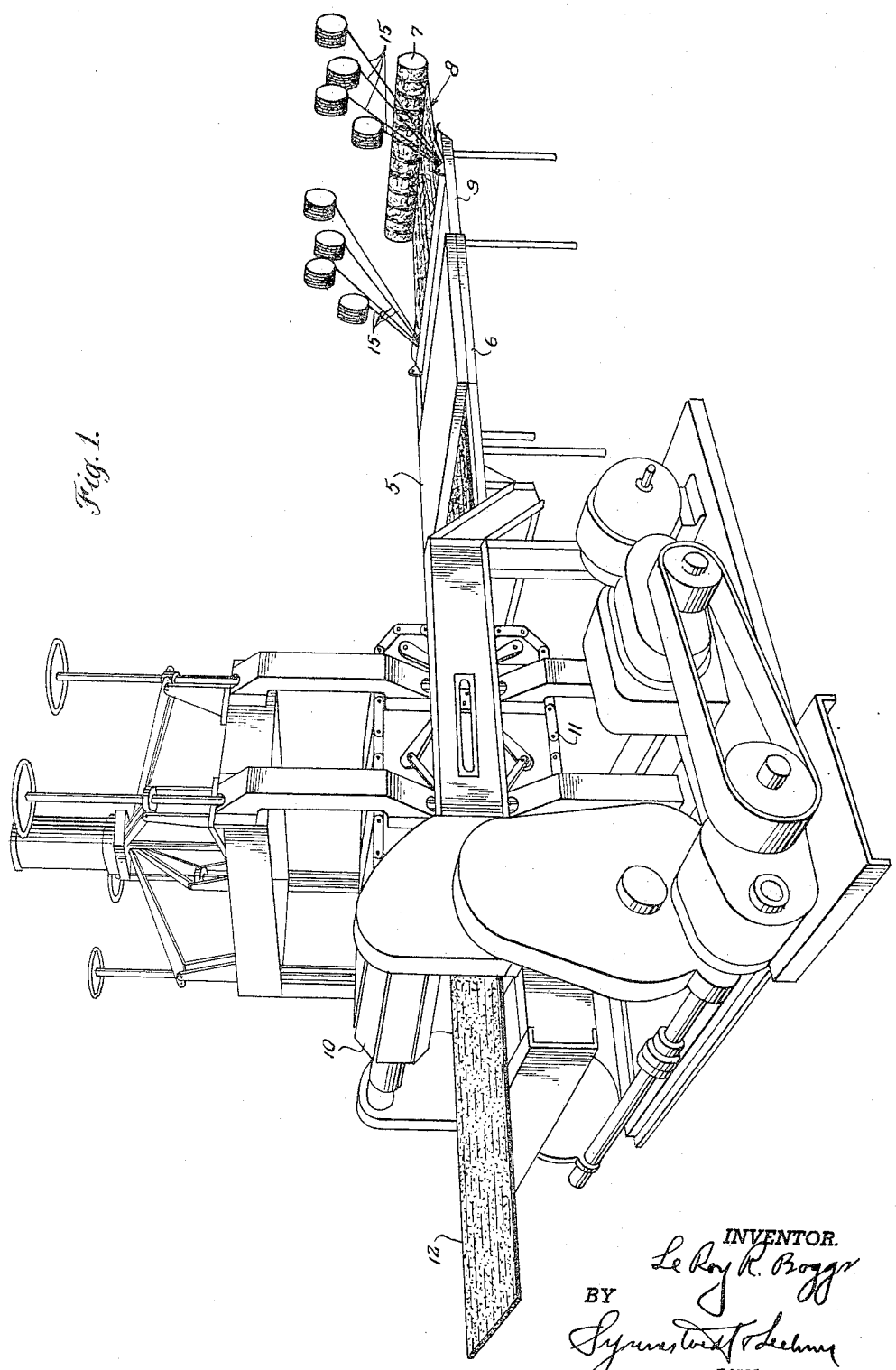

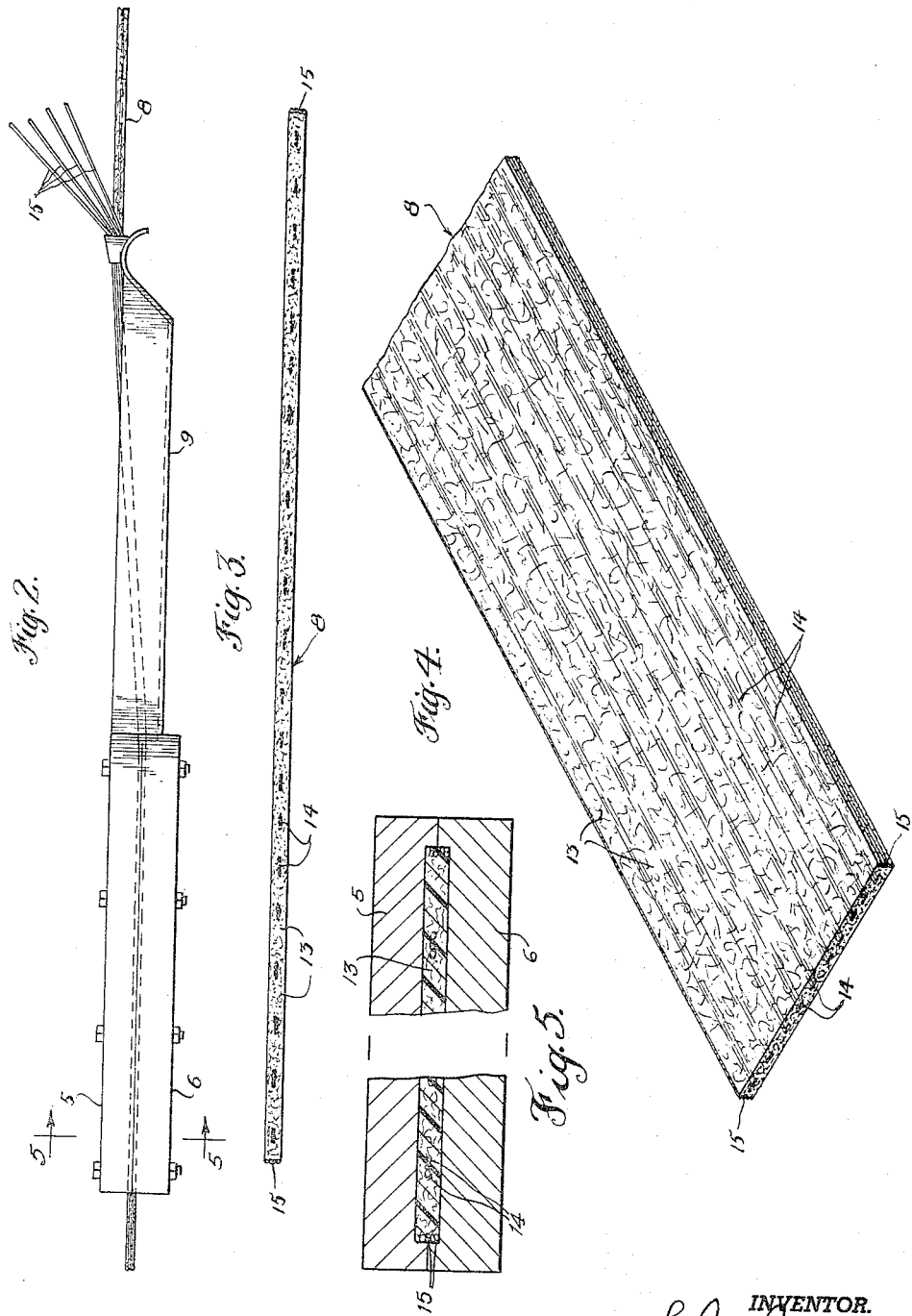

3,244,570
PRODUCTION OF FIBER REINFORCED
RESIN ARTICLES
Le Roy R. Boggs, Bristol, Tenn., assignor to Universal
Moulded Fiber Glass Corp., Bristol, Va., a corporation
of Virginia
Filed Dec. 11, 1962, Ser. No. 243,872
2 Claims. (Cl. 156—178)

This invention relates to production of fiber reinforced resin articles, for instance articles formed of polyester or laminating type resins reinforced with glass fibers. The invention is particularly concerned with the production of such articles where the articles are elongated and have substantially uniform thickness from edge to edge thereof, for instance strips or sheets, or shaped sections such as angles or channels, where the various portions of the shaped section are all of uniform thickness.

In my copending applications Serials Nos. 2,760 filed January 15, 1960 (refiled as Serial No. 408,488, November 3, 1964), 115,633 filed June 8, 1961, and 138,350 filed September 15, 1961 (issued as Patent 3,185,746, May 25, 1965), I have disclosed various embodiments of a technique for making fiber reinforced resin articles of various shapes, including shapes of the kinds mentioned just above. Briefly described, that technique involves the feeding of a multiplicity of resin impregnated fiber reinforcing elements to and through a forming passage, heating the resin material to cure the resin in said passage, and pulling on the solidified piece beyond the delivery end of the forming passage in order to feed or advance the materials through the system.

It has been found that in the making of articles of certain types or shapes by the technique briefly described above, uniform and accurate distribution of the various reinforcement elements is difficult to maintain. For example in the making of a sheet the various plies or layers of fibrous reinforcement mats have a tendency to wrinkle or pucker from time to time, thereby causing lumps or other irregularities in the reinforcement, and this has certain disadvantages including non-uniformity of structure of the formed article, variation in tensile strength and other physical characteristics of the article. Moreover, when using a multiplicity of fibrous reinforcing elements in the making of a sheet, difficulty is frequently experienced in maintaining proper positioning of the reinforcing elements in the edge portions of the sheets, in consequence of which in certain instances the edges have become ragged. In consequence of this, if a sheet is to be made of a given width it would be necessary to initially use an oversized forming passage and then rely upon trimming off ragged edges in order to provide a sheet with properly formed and reinforced straight edges.

I have found that various of the foregoing difficulties are overcome by the employment in an operation of the kind above referred to of a single ply of fibrous reinforcement, preferably in the form of a single ply of fibrous mat of composite structure incorporating fibers of two types or arrangement, namely randomly oriented or distributed fibers, and also fibers which have definite orientation within the mat, preferably lengthwise of the mat and of the elongated article being formed. The employment of a single ply of such a composite mat avoids wrinkling and also maintains substantially uniform distribution of the fibrous reinforcement even up to a point closely adjacent to the edges of the piece being formed.

How the foregoing objects and advantages, together with others which will occur to those skilled in the art, will be clear from the following description referring to the accompanying drawings, in which:

FIGURE 1 is an outline perspective view of a machine for making a sheet type of article in accordance with the present invention;

FIGURE 2 is an enlarged side elevational view of the forming device and resin impregnating reservoir, with the reinforcement illustrated as passing through the resin reservoir and the forming passage of the forming device;

FIGURE 3 is an end view of a composite mat reinforcement of the kind contemplated for use according to the invention;

FIGURE 4 is a fragmentary isometric view of a piece of composite reinforcement used according to the invention; and FIGURE 5 is transverse sectional view taken as indicated by the section line 5—5 on FIGURE 2, FIGURE 5 being on an enlarged scale as compared with FIGURE 2.

Referring first to FIGURES 1 and 2, it is first noted that many details of the forming apparatus itself need not be illustrated or described herein as such details form no part of the present invention per se and are fully disclosed in the copending applications above referred to. Briefly, as shown in FIGURES 1 and 2, the forming device comprises a pair of die parts 5 and 6 between which a forming passage is provided conforming with the cross-sectional shape of the article being formed. From a supply roll 7, a fibrous mat 8 is fed into the liquid resin contained in the resin pad or reservoir 9, the mat passing from there to the entrance end of the forming passage provided between the die parts 5 and 6. The entrance end of the forming passage is tapered to an enlarged entrance opening to effect compression of the impregnated reinforcement and to expel and return excess resin to the resin pan. These die parts are provided with heating means (not shown) as is more fully disclosed in the copending applications above referred to, in order to provide for curing of the resin as it passes through the forming passage and thus for solidification of the article being formed while it is passing through the forming device. Cooling means are also preferably provided in the region of the tapered entrance end of the forming passage in order to prevent premature solidification of the resin therein and also to prevent solidification of the resin in the resin pan 9. After emergence of the cured fiber impregnated article from the delivery end of the forming passage, the article is engaged between a pair of crawler tread devices 10 and 11 which grip the piece and thus feed the materials through the system, delivering the completed article to the left as seen in FIGURE 1 at 12.

FIGURES 3 and 4 illustrate a mat of composite structure of the type usable according to the present invention. From these two figures it will be seen that the mat comprises randomly oriented fibers, which are represented by various irregularly shaped lines 13, and also oriented fibers which are represented by the straight dash lines 14 in FIGURE 4, these oriented fibers being in groups as will also be seen in the end view of FIGURE 3 and at the left end of FIGURE 4.

In the case of employment of glass fiber reinforcement, as is preferred in accordance with the present invention, the oriented strands or fibers 14 advantageously take the form of rovings which are positioned interiorly of a mass or mat of randomly oriented fibers, making up a composite structure of the desired thickness so that only a single ply is employed. In a typical case where a sheet or similar article is being formed, the mat, in its original uncompressed form, may be about ¼ inch in thickness, and such a mat will provide effective reinforcement for an article about ⅒ inch in thickness.

In the cross sectional view of FIGURE 5, a cross section through the article being formed appears in the region just before the article is delivered from the forming passage provided between the die parts 5 and 6. This cross sectional view indicates the presence of both the random fibers 13 and also the rovings 14. These fibrous reinforcement elements are distributed in the resin mamaterial, the presence of which is indicated in FIGURE 5 by cross hatching.

For most purposes the presence of oriented fibers or strands extended lengthwise of the mat and thus of the article being formed provides adequate and desirable reinforcement, but a composite mat containing not only the random fibers but also a woven fabric, instead of or in addition to the rovings, may also be used, in which event there will be present in the mat oriented fibers extended not only lengthwise of the mat but also transversely thereof.

The combination of the random fibers and the oriented fibers provides adequate reinforcement bulk to effectively fill the forming passage during the forming operation, while at the same time overcoming some of the difficulties heretofore encountered where articles of the kind here involved (for instance sheets or channels) are made up by employing a multiplicity of plies or layers of separate reinforcement elements.

Although the embodiment illustrated provides for the production of a sheet in flat form, it will be understood that the invention is also applicable to the production of certain other articles such as corrugated sheets or to the production of channels or any other cross-sectional shape in which the cross section is of substantially uniform thickness from edge to edge of the article, i.e., throughout the section of the article.

According to the invention it is also contemplated that in the production of an article of the kind above referred to, in addition to the single ply of the composite mat, glass fiber rovings 15 be fed into the forming device adjacent the extreme edges of the article being formed. Such rovings are shown being fed from a plurality of spools at each edge of mat 8, the rovings preferably also being impregnated by passage through the resin bath. The edge rovings 15 also appear embedded in the edges of the article being made in the cross section of FIGURE 5. In some instances this further aids in obtaining uniformity of the edges of the article. In any event it will be noted that the single ply of the composite mat extends substantially throughout the width of the article. In the case of a channel or other similarly shaped article, it is contemplated that the single ply be of sufficient width to extend substantially from edge to edge of the article, even though portions of the mat may of course be flexed so as to be fed in different planes, depending upon the cross section of the article. In some cases separate pieces of the composite mat may be used in different parts of the article transversely of the section thereof, but even in such a case it is preferred to use only a single ply or layer, for reasons already fully explained.

I claim:

1. A method for making solid elongated articles composed of fiber reinforced resin and of large width as compared to the thickness thereof and having uniform thickness substantially from edge to edge thereof, which method comprises passing the fiber reinforcement into and through a body of liquid heat hardenable resin material to effect impregnation of the reinforcement with an excess of the resin material, feeding the impregnated reinforcement to and through a forming device having stationary walls in contact with the impregnated reinforcement and defining the sides and edges of a forming passage of appreciable length and of uniform cross section conforming with that of the article being formed, thereby expelling the excess resin material, said fiber reinforcement comprising a single ply of fibrous mat of composite structure including both randomly oriented fibers and fibers oriented lengthwise of the mat, heating the resin material while passing through the forming passage of uniform cross section to solidify the article therein in the shape of said passage, and pulling on the formed solid article beyond the delivery end of the forming passage to feed the materials through the system.

2. A method for making solid elongated articles composed of fiber reinforced resin and of large width as compared to the thickness thereof and having uniform thickness substantially from edge to edge thereof, which method comprises passing the fiber reinforcement into and through a body of liquid heat hardenable resin material to effect impregnation of the reinforcement with an excess of the resin material, feeding the impregnated reinforcement to and through a forming device having stationary walls in contact with the impregnated reinforcement and defining the sides and edges of a forming passage of appreciable length and of uniform cross section conforming with that of the article being formed, thereby expelling the excess resin material, said fiber reinforcement comprising a single ply of fibrous mat of composite structure including both randomly oriented fibers and fibers oriented lengthwise of the mat, said mat further being of width sufficient to extend substantially from edge to edge of the article being formed, feeding into the forming passage in position to contact the stationary edge walls thereof further fiber reinforcement in the form of strands, heating the resin material while passing through the forming passage of uniform cross section to solidify the article therein in the shape of said passage, and pulling on the formed solid article beyond the delivery end of the forming passage to feed the materials through the system.

References Cited by the Examiner

UNITED STATES PATENTS

| | | | |
|---|---|---|---|
| 2,682,292 | 6/1954 | Nagin. | |
| 2,731,066 | 1/1956 | Hogendobler et al. | 156—62.8 X |
| 2,771,387 | 11/1956 | Kleist et al. | 156—62.8 X |
| 2,784,763 | 3/1957 | Shorts. | |
| 2,927,623 | 3/1960 | Huisman et al. | 156—179 |
| 2,948,649 | 8/1960 | Pancherz | 156—498 X |
| 2,977,630 | 4/1961 | Bazler | 156—242 X |
| 2,979,431 | 4/1961 | Perrault | 156—244 |
| 3,108,028 | 10/1963 | Sprunck et al. | 156—178 |

FOREIGN PATENTS

| | | |
|---|---|---|
| 558,162 | 6/1958 | Canada. |
| 577,612 | 6/1959 | Canada. |

EARL M. BERGERT, *Primary Examiner.*

JACOB STEINBERG, ALEXANDER WYMAN,
*Examiners.*

W. POWELL, *Assistant Examiner.*